(12) United States Patent
Higashino et al.

(10) Patent No.: US 7,413,222 B2
(45) Date of Patent: Aug. 19, 2008

(54) POSITION ADJUSTMENT TYPE STEERING COLUMN DEVICE FOR VEHICLES

(75) Inventors: Kiyoharu Higashino, Gunma (JP); Kiyoshi Sadakata, Gunma (JP)

(73) Assignee: NSK Ltd., Tokyo (JP)

( * ) Notice: Subject to any disclaimer, the term of this patent is extended or adjusted under 35 U.S.C. 154(b) by 393 days.

(21) Appl. No.: 10/544,006

(22) PCT Filed: Aug. 31, 2004

(86) PCT No.: PCT/JP2004/012896

§ 371 (c)(1),
(2), (4) Date: Aug. 1, 2005

(87) PCT Pub. No.: WO2005/021355

PCT Pub. Date: Mar. 10, 2005

(65) Prior Publication Data

US 2006/0151984 A1    Jul. 13, 2006

(30) Foreign Application Priority Data

Sep. 1, 2003   (JP)   ............................ 2003-309069

(51) Int. Cl.
*B62D 1/18*   (2006.01)
(52) U.S. Cl. ........................ 280/775; 74/493
(58) Field of Classification Search ............... 280/775; 74/493; *B62D 1/18*
See application file for complete search history.

(56) References Cited

U.S. PATENT DOCUMENTS

| | | | |
|---|---|---|---|
| 5,199,319 A | 4/1993 | Fujiu | |
| 5,607,184 A * | 3/1997 | Barton | 280/775 |
| 5,992,263 A * | 11/1999 | Bleuel et al. | 74/493 |
| 2001/0019205 A1 * | 9/2001 | Ikeda et al. | 280/775 |
| 2002/0084644 A1 * | 7/2002 | Rinker et al. | 280/775 |
| 2002/0089161 A1 * | 7/2002 | Yamamura et al. | 280/777 |

FOREIGN PATENT DOCUMENTS

| | | | |
|---|---|---|---|
| EP | 1 125 820 A2 | | 8/2001 |
| JP | 58-36761 | | 3/1983 |
| JP | 5-60982 U | | 8/1993 |
| JP | 9-11914 A | | 1/1997 |
| JP | 09011914 A | * | 1/1997 |
| JP | 10-53144 A | | 2/1998 |
| JP | 10053144 A | * | 2/1998 |
| JP | 10-512826 A | | 12/1998 |
| JP | 2001-191927 A | | 7/2001 |
| JP | 2001191927 A | * | 7/2001 |
| JP | 2002-59848 A | | 2/2002 |
| JP | 2002-59850 A | | 2/2002 |
| JP | 2002059848 A | * | 2/2002 |
| JP | 2002059850 A | * | 2/2002 |

* cited by examiner

*Primary Examiner*—Christopher Ellis
*Assistant Examiner*—Jacob Meyer
(74) *Attorney, Agent, or Firm*—Sughrue Mion, PLLC

(57) ABSTRACT

A vehicular steering column system includes an outer column and an inner column which fits slidably in the outer column, whereby a relative position between the inner column and the outer column is adjusted by expanding and contracting the diameter of an inner circumferential surface of the outer column. An iron bush is provided between the inner circumferential surface of the outer column and an outer circumferential surface of the inner column in such a manner as to fit in or on at least the inner circumferential surface of the outer column or the outer circumferential surface of the inner column.

7 Claims, 14 Drawing Sheets

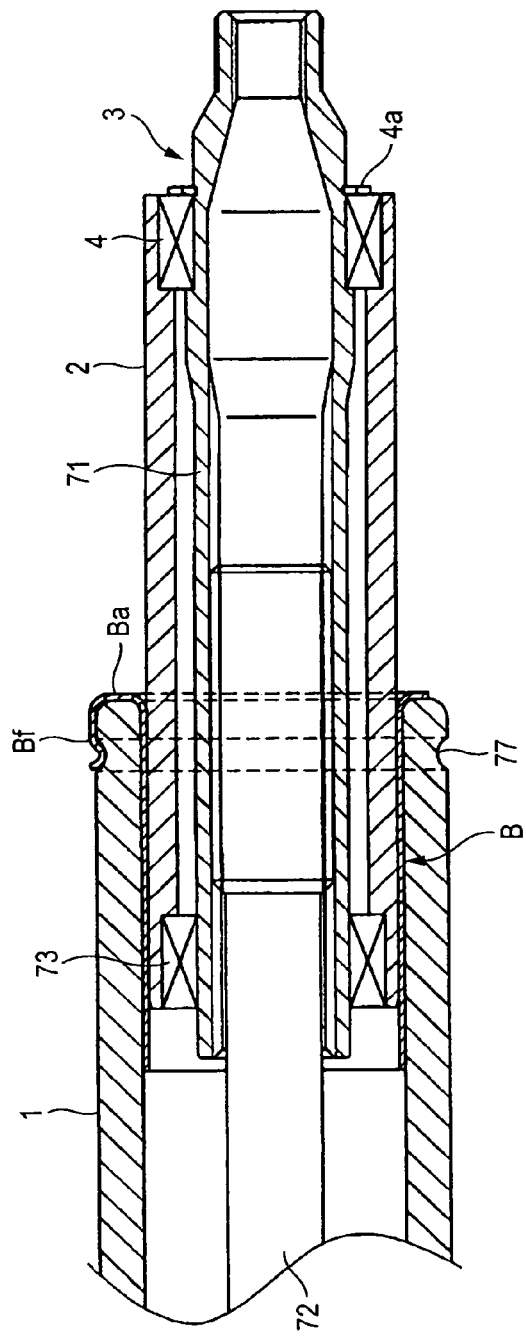
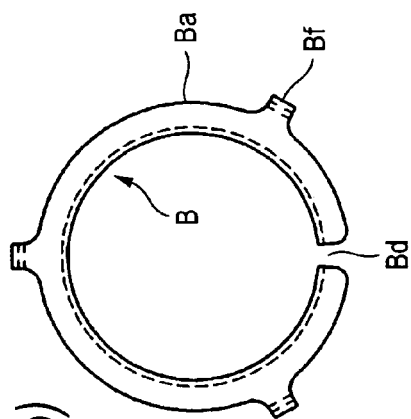
FIG. 11 (a)
FIG. 11 (b)

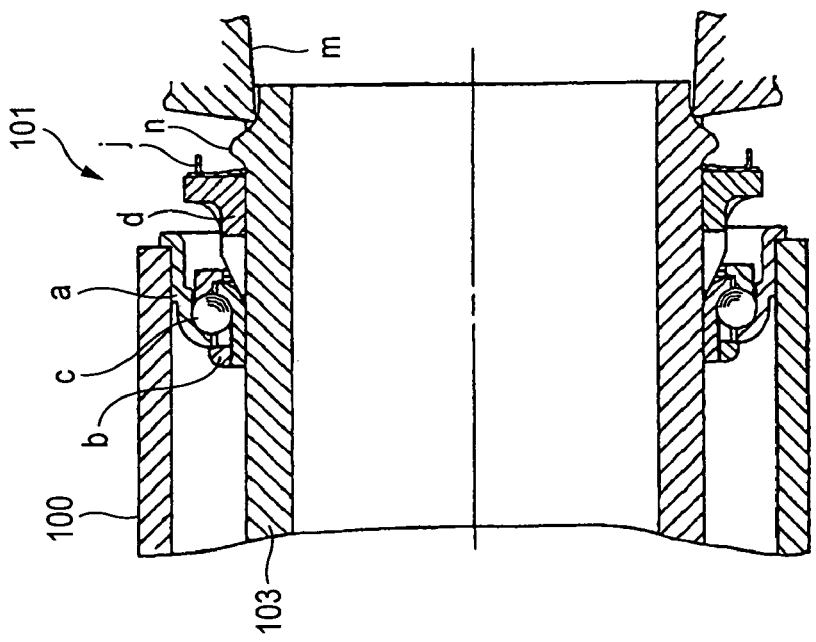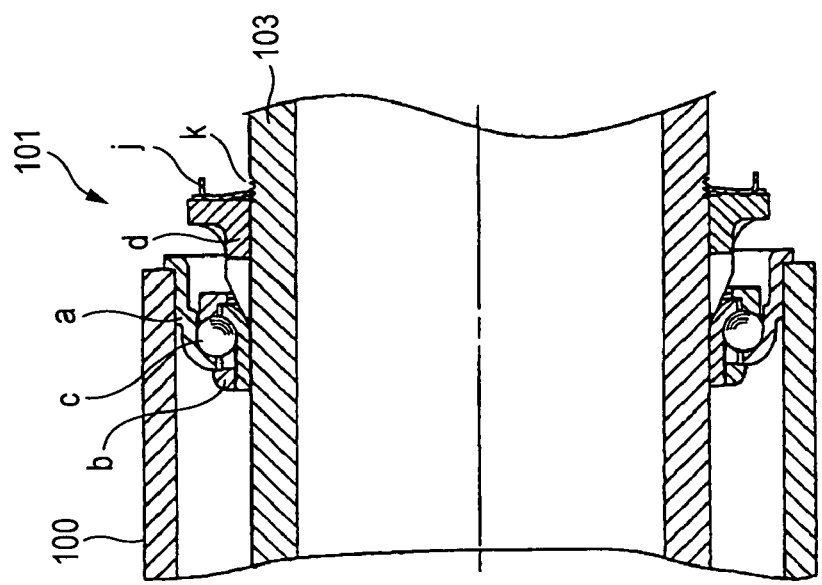

POSITION ADJUSTMENT TYPE STEERING COLUMN DEVICE FOR VEHICLES

TECHNICAL FIELD

The present invention relates to a vehicular position adjustable steering column system in which an outer column and an inner column are slidably fitted on or in each other, whereby the position of the inner column can be adjusted by diametrically contracting an inner circumferential surface of the outer column.

BACKGROUND ART

In telescoping steering column systems in which the axial position of a steering wheel can be adjusted according to the body frame and driving posture of the driver, as disclosed in, for example, Japanese Utility Model Unexamined Publication JP-UM-A-5-60982 and Japanese Patent Unexamined Publication JP-A-10-53144, an inner column to which a steering column is attached is provided in such a manner as to slide telescopically relative to an outer column fixed to a vehicle body.

In addition, in the JP-UM-A-5-60982 and JP-A-10-53144, a resin bush (a resin collar) is interposed between the outer column and the inner column, and the resin bush so interposed is fixed to an inner circumferential surface of the outer column via projections formed on the bush.

Consequently, when performing a telescopic adjustment, since the inner column can slide through an inner circumferential surface of the resin bush, the inner column is allowed to telescopically slide relatively smoothly.

DISCLOSURE OF THE INVENTION

However, there is an increasing tendency in which an outer column, which is made of a relatively soft material such as aluminum and magnesium, is integrated with other functional parts.

In such a case, while there is surfacing almost no problem as long as a normal telescoping operation is performed, there is an increasing tendency in which the telescoping function also has to have a collapsing (energy absorbing) performance under a state in which a bending load is applied to the steering system as occurring when the vehicle is involved in a collision.

In such a case, it sometimes happens that the resin bush is so soft as to be deformed and hence cannot provide a smooth collapsing performance. Consequently, there has been a demand for iron bushes which can complement the soft outer columns.

In the case of iron bushes, however, being different from resin bushes, when attempting to fix iron bushes, there are existing relatively many problems with machining and assembling characteristics, and even with iron bushes, in case an iron bush is fixed to the outer column insufficiently, the iron bush is rolled in the column while in a collapse, and hence the required collapsing performance cannot be exhibited in a stable fashion.

The invention was made in view of the situations, and an object thereof is to a vehicular position adjustable steering column system which has superior machining and assembling characteristics, which can ensure the fixing to the outer column or the like, and which can realize the implementation of a smooth and stable basic performance such as a sliding characteristic during telescoping and collapsing operations.

The invention provides a vehicular position adjustable steering column system including an outer column, an inner column which fits slidably in the outer column, and an iron bush which is interposed between an inner circumferential surface of the outer column and an outer circumferential surface of the inner column and which fits in or on at least one of the inner circumferential surface of the outer column and the outer circumferential surface of the inner column, wherein a relative position between the inner column and the outer column is adjusted by extending and contracting a diameter of the inner circumferential surface of the outer column.

Preferably, the iron bush is bent back at one end portion of at least one of the outer column and the inner column.

Preferably, a groove is provided in part of at least one of the inner circumferential surface of the outer column and the outer circumferential surface of the inner column, and a projection adopted to engage with the groove is provided on the iron bush.

Preferably, the vehicle steering column system includes further a position adjusting clamp mechanism which includes a pair of clamping portions which are formed on the outer column, are faced each other across a slit, encloses and holds the inner column and are adapted to contract and expand so as to fasten and release the inner column, a pair of fastening bolts which are provided on sides of the pair of clamping portions, respectively, and are disposed in a direction which intersects with an axis of a steering shaft, a fastening mechanism for moving one of the pair of fastening bolts in a fastening direction or a releasing direction in response to a swing of a manipulation lever, and a tension member which is provided radially outwardly of the outer column in such a manner as to form a substantially annular shape for connection of the pair of fastening bolts and is adapted to move the other fastening bolt in the fastening direction or the releasing direction when the one of the pair of fastening bolts is moved in the fastening direction or the releasing direction by the fastening mechanism.

Preferably, the vehicle steering column system includes further a position adjusting clamp mechanism which has a pair of thick clamping portions which are formed thick on the outer column, are faced each other across a slit, encloses and holds the inner column and are adapted to contract and expand so as to fasten and release the inner column, a fastening bolt provided in such a manner as to pass through the pair of thick clamping portions, and a fastening mechanism for moving the fastening bolt in a fastening direction or a releasing direction in response to a swing of a manipulation lever.

Preferably, the iron bush includes a collar portion, and the collar portion is brought into engagement with an end portion of at least one of the outer column and the inner column.

Preferably, the vehicle steering column system includes further a stopper portion for restricting a relative movement of the iron bush relative to the outer column or the inner column.

BRIEF DESCRIPTION OF THE DRAWINGS

FIG. 11(a) is a longitudinal sectional view of a vehicle tilt and telescoping steering system according to a seventh embodiment of the invention, and FIG. 11(b) is a cross-sectional view of an iron bush.

FIG. 14(a) is a sectional view showing a main portion according to a first modified example of the ninth embodiment, and FIG. 14(b) is a sectional view showing a main portion according to a second modified example of the ninth embodiment.

BEST MODE FOR CARRYING OUT THE INVENTION

Hereinafter, a vehicular position adjustable steering column system according to a best mode for carrying out the invention will be described by reference to the drawings.

FIRST EMBODIMENT

Figure 1:
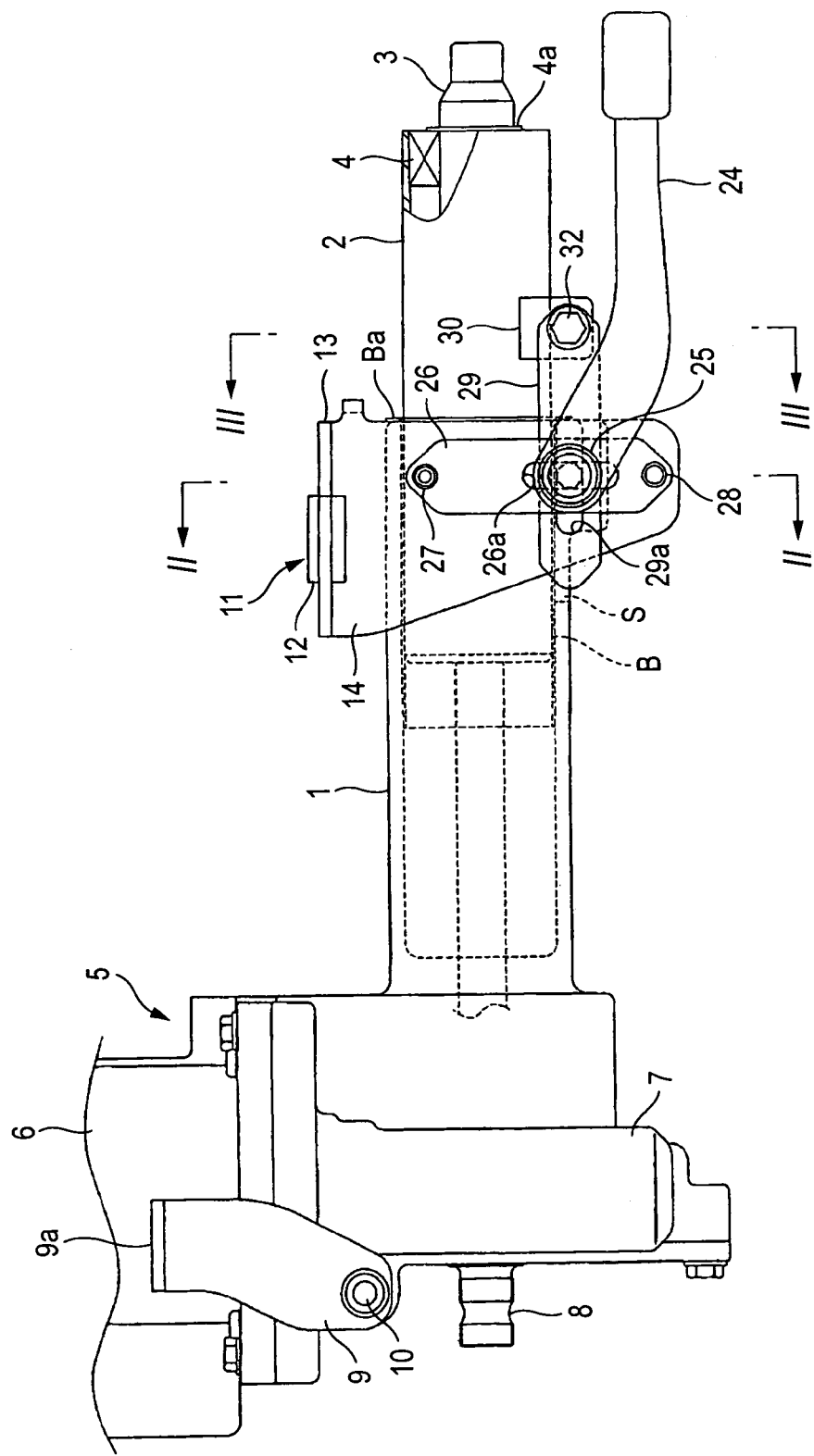
FIG. 1 is a side view of a vehicle tilt and telescoping steering column system according to a first embodiment of the invention.

FIG. 1 is a side view of a vehicle tilt and telescoping steering column system according to a first embodiment of the invention.

Figure 2:
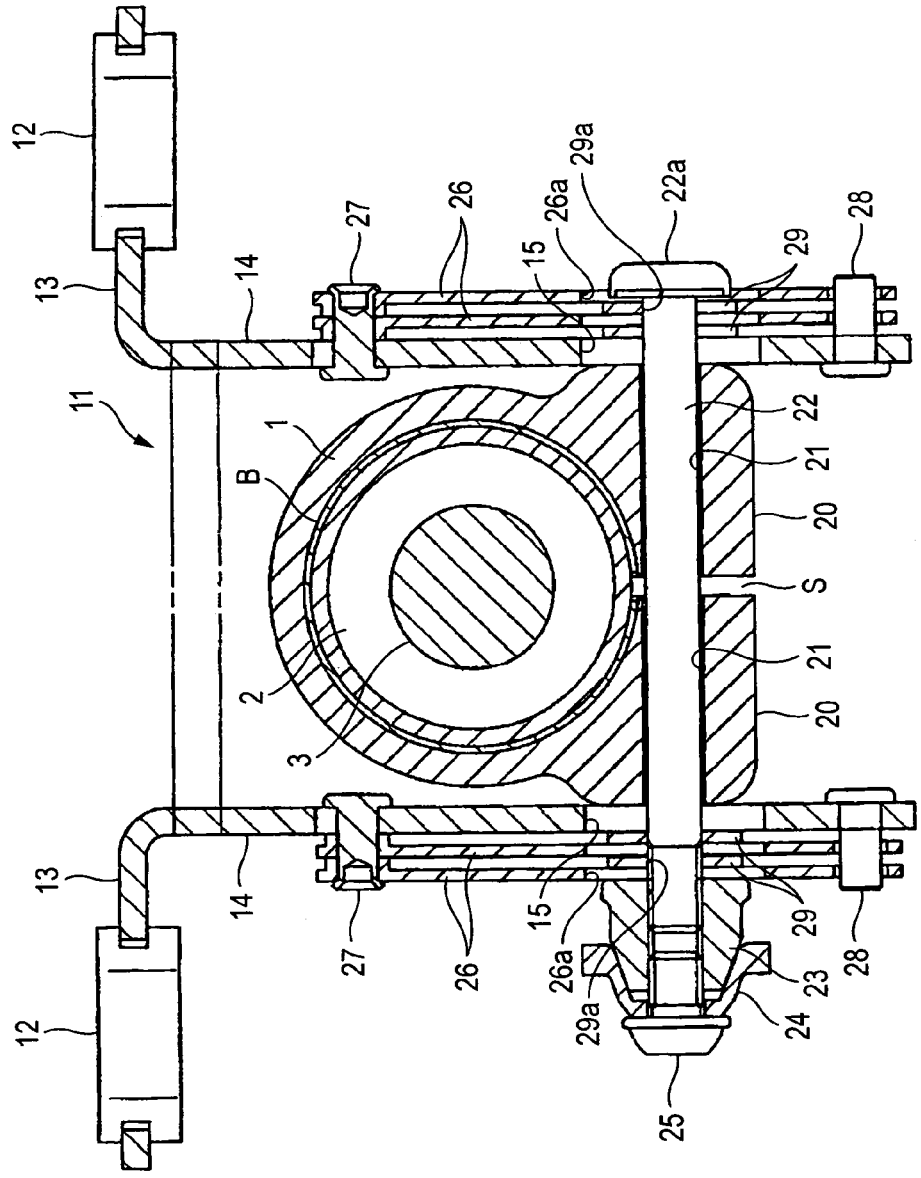
FIG. 2 is a cross-sectional view taken along the line II-II in FIG. 1.
Figure 3:
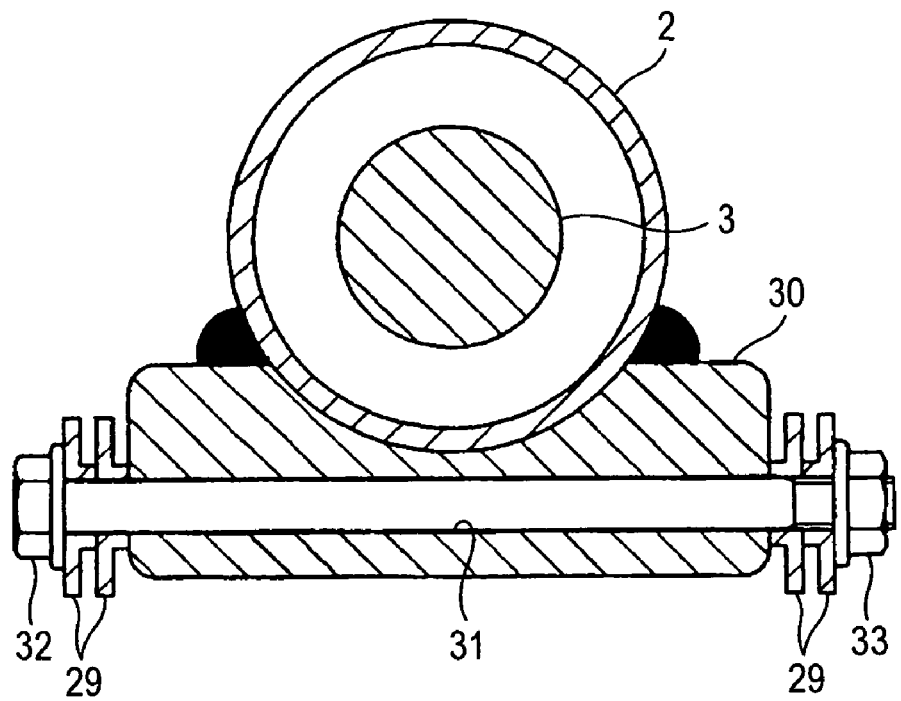
FIG. 3 is a cross-sectional view taken along the line III-III in FIG. 1.

FIG. 2 is a cross-sectional view taken along the line II-II in FIG. 1. FIG. 3 is a cross-sectional view taken along the line III-III in FIG. 3.

A first embodiment is, as shown in FIGS. 1 and 2, a tilt and telescoping type in which clamping is carried out at a clamping position located on a lower side of an inner column.

A steering column is made up of a lower column 1 (an outer column) fixed to a vehicle body and an upper column 2 (an inner column) that fits telescopically slidably in the lower column 1 and is adapted to collapse and contract when the vehicle is involved in a secondary collision.

Note that the lower column 1 is made of aluminum, and the upper column 2 is made of iron or aluminum A steering shaft 3 is provided rotatably within both the columns 1, 2 and is supported rotatably by means of a bearing 4 of the upper column 2. Note that the steering shaft 3 and the bearing 4 are fixed relative to each other by means of a snap ring 4a.

In addition, an electric power steering system 5 (EPS) is provided on the lower column 1, and the electric power steering system 5 includes an electric motor 6, a speed reduction mechanism unit (not shown) and an output shaft 8. Note that the speed reduction mechanism unit is surrounded by a housing 7. In addition, the lower column 1 and the housing 7 are formed into an integral unit.

The lower column 1 is supported on a vehicle body by a lower vehicle body side bracket 9 on sides of the housing 7, and a tilt pivot 10 is provided on the lower vehicle body side bracket 9. Note that the lower vehicle body side bracket 9 has vehicle body mount portions 9a that are to be mounted on to the vehicle body.

An upper vehicle body side bracket 11 is provided at a rear portion of the lower column 1, and this upper vehicle body side bracket 11 has a pair of vehicle body mount portions 13, 13 that are to be mounted on to the vehicle body via secondary collision dislodgement capsules 12, 12 and a pair of facing flat plate portions 14, 14 which are extended, respectively, from the vehicle body mount portions 13, 13 in such a manner as to face each other. The pair of facing flat plate portions 14, 14 each have a pair of tilt elongate hole 15, 15 formed therein.

A tilt and telescoping clamp mechanism is provided on this upper vehicle body side bracket 11.

A pair of thick clamping portions 20, 20 are provided on the lower column 1 which are formed thick in a radial direction of the column and in a transverse direction of the vehicle via a slit in such a manner as to enclose and hold the upper column 2 and are adapted to contract and expand so as to fasten and release the upper column 2.

A pair of through holes 21, 21 are formed in the pair of clamping portions 20, 20. A fastening bolt 22 is passed through this through holes 21, 21, and a head portion 22a of the fastening bolt 22 is in engagement with an elongate hole 26a in a friction plate 26, which will be described later on, so as to be normally non-rotatable.

An adjustment nut 23 is screwed on a threaded side of the fastening bolt 22, and an end portion of an manipulation lever 24 is fitted on the adjustment nut 23 via tapered surfaces formed in and on the end portion of the manipulation lever 24 and the adjustment nut 23, furthermore, a mount bolt 25 being fixedly screwed on.

Consequently, when the manipulation lever 24 is rotated in one direction, the adjustment nut 23 is rotated together therewith, and the non-rotatably fastening bolt 22 is pulled in an axial direction thereof, whereby the facing flat plate portions 14, 14 are fastened, whereas when the manipulation lever 24 is rotated in the other direction, the adjustment nut 23 is rotated together therewith, and the non-rotatably fastening bolt 22 is released from the axially pulled state, whereby the facing flat plate portions 14, 14 are, in turn, released from the fastened state thereof.

In addition, a multi-plate friction engagement mechanism is used. Namely, tilt friction plates 26, 26 . . . are secured, respectively, to external sides of the facing flat plate portions 14, 14 with pairs of upper and lower rivets 27, 28. Telescoping friction plates 29, 29 . . . are interposed between the friction plates 26, 26 . . . . Elongate holes 26a . . . are formed in the tilt friction plates 26, 26 . . . in such a manner as to correspond to the tilt elongate hole 15, and elongate holes 29a . . . are formed in the telescoping friction plates 29, 29 . . . in such a manner as to correspond to a telescoping adjustment range. No relative movement is permitted between the friction plates 29, 29 . . . and the upper column 2.

In addition, as shown in FIG. 3, a block 30 is fixed to a lower side of the upper column 2 (the inner column) by virtue of welding or the like, and a through hole 31 is formed in the block 30. A bolt 32 is then passed through the through hole 31 and a nut 33 is screwed thereon via the telescoping friction plates 29, 29 . . . .

Consequently, in performing tilt and telescoping adjustments, when the manipulation lever 24 is rotated in one direction, the adjustment nut 23 is rotated together therewith so as to release the non-rotatably fastening bolt 22 from the axially pulled state, whereby the fastening of the facing flat plate portions 14, 14, the pair of clamping portions 20, 20, the friction plates 26, 29 . . . , and the like is released. Namely, a space between the pair of facing flat plate portions 14, 14 is widened, and the fastening of the pair of clamping portions 20, 20 is released, whereby a gap therebetween is widened.

From this series of actions, the lower column 1, the upper column 2 and the steering shaft 3 are rotated about the tilt pivot 10, and this completes the tilt adjustment.

In addition, the upper column 2 (the inner column) and the steering shaft 3 are allowed to slide in an axial direction thereof relative to the pair of clamping portions 20, 20, which are so widened, (namely, relative to the lower column 1 (the outer column)), whereby the telescoping adjustment is completed.

As this occurs, since the friction plates 29 are mounted on the upper column 2, which is adapted to slide telescopically, the telescoping elongate holes 29a, 29a function as stoppers for restricting a telescoping sliding range when they are brought into abutment with the fastening bolt 22.

On the other hand, in performing tilt and telescoping fastening, when the manipulation lever 24 is rotated in the reverse direction, the adjustment nut 23 is rotated together therewith, and the non-fastening bolt 22 is pulled in the axial direction thereof, whereby the pair of facing flat plate portions 14, 14 are fastened.

As a result, the space between the pair of facing flat plate portions 14, 14 is narrowed, and the pair of clamping portions 20, 20 are fastened, whereby the pair of clamping portions 20, 20 are brought into press contact with the upper column 2 (the inner column) so as to hold the upper column 2 (the inner column) therebetween, the tilt and telescoping fastening being thereby completed.

Incidentally, in this embodiment, a tubular iron bush B is fitted in or on at least an inner circumferential surface of the lower column 1 (the outer column) and an outer circumferential surface of the upper column 2 (the inner column) at a fitting portion where both the columns 1, 2 are fitted on or in.

To be specific, as shown in FIG. 1, the tubular iron bush B is fitted (press fitted) in the inner circumferential surface of the lower column 1 (the outer column) and the bush B has a collar portion Ba which is bent back at an end portion of the lower column 1. This collar portion Ba is brought into engagement with an end edge of the lower column 1 (the outer column) to thereby prevent the bush B from being swallowed into the lower column 1.

The upper column 2 moves longitudinally through a telescoping operation (a telescoping adjustment). In this embodiment, sliding surfaces can be limited to an inner circumferential surface of the bush B and the outer circumferential surface of the upper column 2 by ensuring the fixing of the bush B with the inner circumferential surface of the lower column 1, which is made stationary, to the stationary side. Consequently, the iron bush B becomes superior in machining and assembling characteristics and the fixing of the iron bush B to the lower column 1 can be ensured, thereby making it possible to realize the implementation of a smooth and stable basic performance such as a sliding characteristic during telescoping and collapsing operations.

This is similarly true at the time of collision (secondary), and in the embodiment, by ensuring the fixing of the bush B to the lower column 1 side, the sliding surfaces can be limited, whereby the collapsing performance is stabilized.

Furthermore, in particular, as in the case of the embodiment, in a steering system of a type in which a column type EPS with a telescoping function is used and a motor 6 and a speed reduction mechanism unit of an EPS 5 are provided at a location where a lower column 1 exists, it is general that a collapsible stroke for collision cannot be ensured sufficiently (an extra limitation is imposed on the steering column system with a telescoping function). Thus, since an energy absorption, which is smooth and strict in following an aimed load to stroke diagram, is necessary within the limited short collapsible stroke, the steering column system according to the embodiment is effective in which the implementation of a smooth and stable basic performance such as a sliding characteristic during collapsing operation is realized within the short collapsible stroke.

SECOND EMBODIMENT

Figure 4:
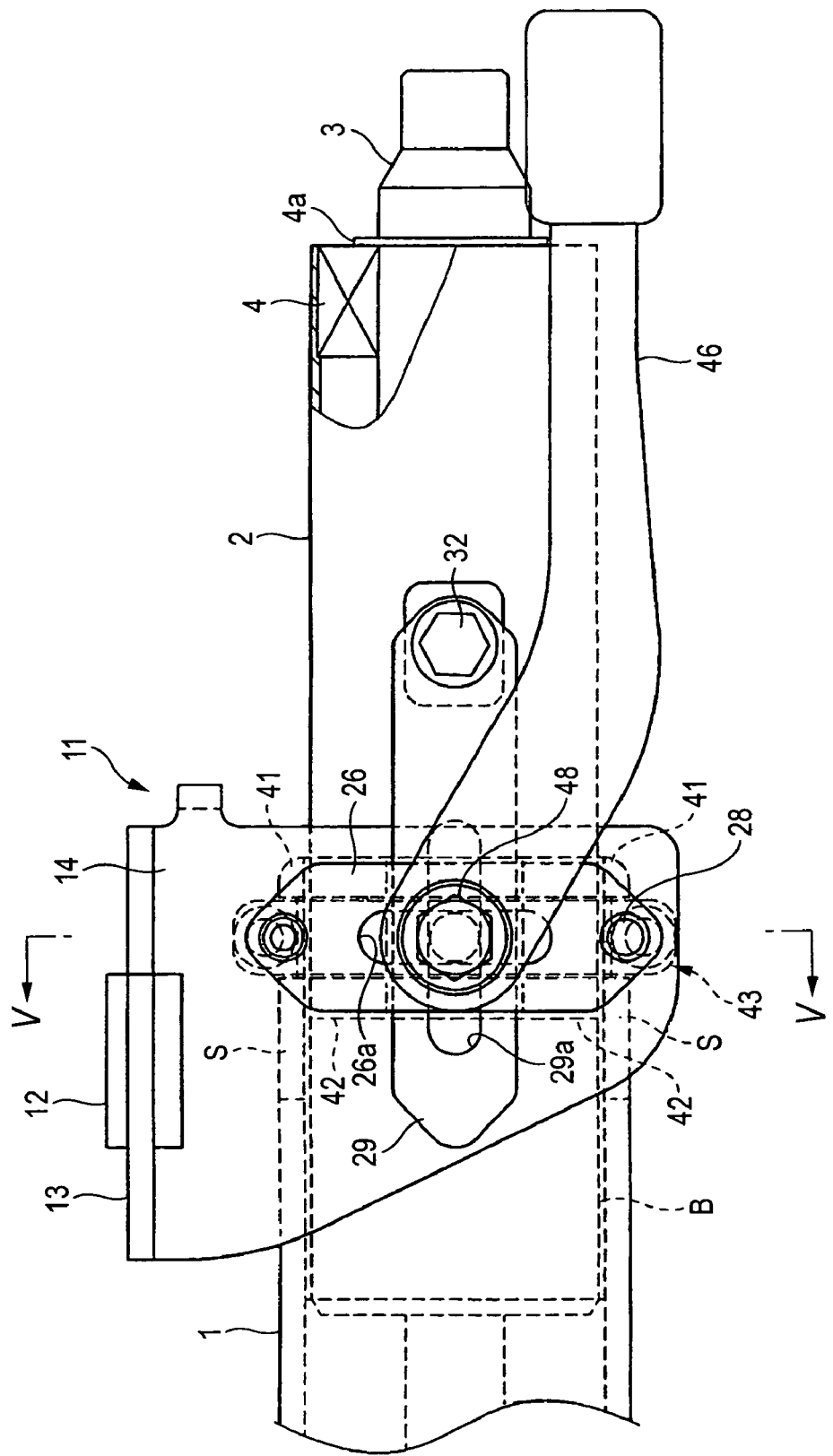
FIG. 4 is a side view of a vehicle tilt and telescoping steering column system according to a second embodiment of the invention.

FIG. 4 is a side view of a vehicle tilt and telescoping steering column system according to a second embodiment of the invention.

Figure 5:
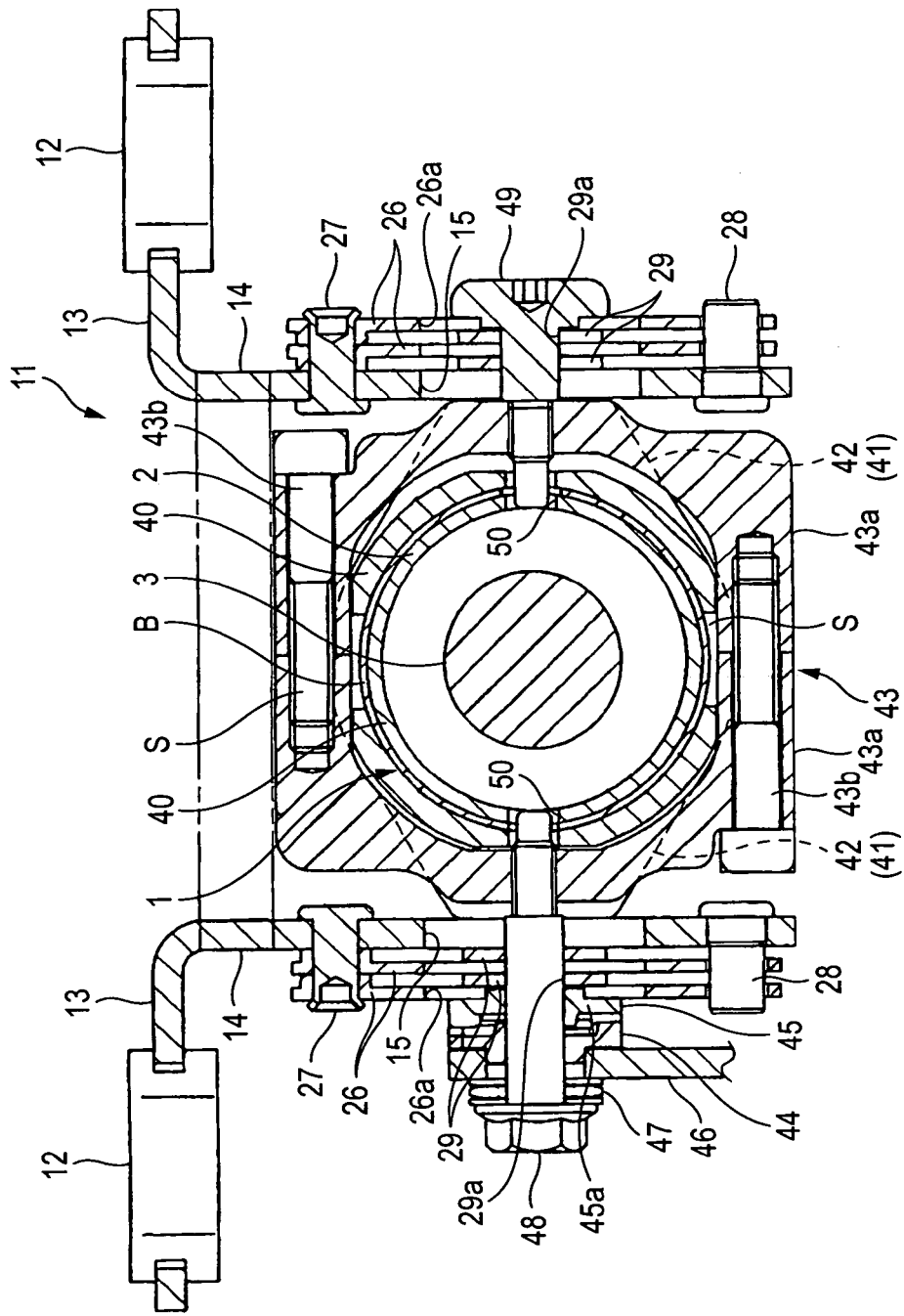
FIG. 5 is a cross-sectional view taken along the line V-V in FIG. 4.

FIG. 5 is a cross-sectional view taken along the line V-V in FIG. 4.

A second embodiment is, as shown in FIGS. 4 and 5, a tilt and telescoping type in which a clamping position thereof is designed to substantially intersect with an axis of a steering shaft.

Note that also in this embodiment, a lower column 1 is made of aluminum and an upper column 2 is made of iron or aluminum.

An upper vehicle body side bracket 11 is provided at a rear portion of the lower column 1, and this upper vehicle body side bracket 11 has a pair of vehicle body mount portions 13, 13 that are to be mounted on to the vehicle body via secondary collision dislodgement capsules 12, 12 and a pair of facing flat plate portions 14, 14 which are extended, respectively, from the vehicle body mount portions 13, 13 in such a manner as to face each other. The pair of facing flat plate portions 14, 14 each have a pair of tilt elongate hole 15, 15 formed therein.

A tilt and telescoping clamp mechanism is provided on this upper vehicle body side bracket 11.

A pair of left and right halved bodies 40, 40 are formed at a longitudinally rear location of the lower column 1, and the pair of left and right halved bodies 40, 40 are equally divided in a transverse direction relative to an axial direction and have two upper and lower slits S, S (slitting), respectively.

Two pairs of clamping portions 41, 41 (42, 42) are provided in front of and behind the halved bodies 40, 40, and slits S, S (slitting) are provided between the two pairs of clamping portions 41, 41 (42, 42).

According to this configuration, when the width of the pair of facing flat plate portions 14, 14 of the upper vehicle body side bracket 11 is narrowed, whereby the two pairs of clamping portions 41, 41 (42, 42) are pressed against in such a manner as to approach each other, the lower column 1 (the pair of halved bodies 40, 40) is diametrically contracted so as to fasten the upper column 2.

A substantially annular tension member 43 is provided along outer circumferences of the pair of left and right halved bodies 40, 40 and between the pair of clamping portions 41, 41 (42, 42) which are spaced apart from each other in a longitudinal direction of the vehicle. Note that the substantially annular tension member 43 is made up of a pair of halved bodies 43a, 43a, which are fixed to each other by means of a pair of bolts 43b, 43b.

A threaded portion of a fastening bolt 48 is screwed and securely fastened to one side of the tension member 43 via a cam mechanism made up of a pair of cam members 44, 45, a manipulation lever 46 and a thrust bearing 47. In addition, a fastening bolt 49 is screwed and securely fastened to the other side of the tension member 43.

Note that the cam mechanism is made up of the first cam member 44 which is adapted to rotate together with the manipulation lever 46 and which has crest portions and root portions and the second cam member 45 which is made non-rotatable and which has crest portions and root portions which are brought into engagement with the crest portions and the root portions of the first cam member 44. The first cam member 44 rotates together with the manipulation lever 46.

In addition, a multi-plate friction engagement mechanism is used. Namely, tilt friction plates 26, 26 . . . are secured, respectively, to external sides of the facing flat plate portions 14, 14 with pairs of upper and lower rivets 27, 28. Telescoping friction plates 29, 29 . . . are interposed between the friction plates 26, 26 . . . . Elongate holes 26a . . . are formed in the tilt friction plates 26, 26 . . . in such a manner as to correspond to the tilt elongate hole 15, and elongate holes 29a . . . are formed in the telescoping friction plates 29, 29 . . . in such a manner as to correspond to a telescoping adjustment range. As with the first embodiment, the friction plates 29 are fixed integrally to the upper column 2 by means of a bolt 32.

Note that the second cam member 45 has a projection 45a which is adapted to be brought into engagement with the tilt elongate hole 26a in the tilt friction plate 26, whereby no relative rotation is permitted between the second cam member 45 and the friction plate 26. However, the second cam member 45 is slidable in a tilting fashion relative to the friction plate 26.

In addition, distal end portions of both fastening bolts 48, 49 are brought into engagement with telescoping elongate holes 50, 50 formed in the upper column 2, and these telescoping elongate holes 50, 50 are designed to function as stoppers for restricting a telescoping sliding range when they are brought into abutment with the distal end portions of the fastening bolts 48, 49.

According to the configuration that has been described heretofore, when performing tilt and telescoping adjustments, firstly, the driver rotates the manipulation lever 46. Then, the first cam member 44, which is in integral engagement with the manipulation lever 46, rotates relatively to the second cam member 45, and a dimension of the cam mechanism (a distance between the first cam member 44 and the second cam member 45) is reduced widthwise.

This eliminates a press contact force acting between the friction plates 26, 29 on one side (a left-hand side as viewed in FIG. 5) of the multi-plate friction engagement mechanism. In addition, a press contact force acting between the friction plates 26, 29 on the other side (a right-hand side as viewed in FIG. 5) is also eliminated via the tension member 43. As a result, both the columns 1, 2 are allowed to tilt.

In addition, when the width dimension (the distance between the first cam member 44 and the second cam member 45) of the cam mechanism is reduced, the pulling force acting between the pair of facing flat plate portions 14, 14 is also eliminated via the tension member 43, and the pressing force applied against the clamping portions 41, 41 (42, 42) on internal sides of the pair of facing flat plate portions 14, 14 is also eliminated.

This allows the lower column 1 (the pair of halved bodies 40, 40) to diametrically expand by virtue of its elastic force and the lower column 1 then loses its tightening force applied to the upper column 2, whereby the upper column 2 is allowed to telescope.

When completing the positional adjustment of the steering wheel through the tilt and telescoping adjustments, the driver rotates the manipulation lever in the other direction. Then, since the width dimension (the distance between the first cam member 44 and the second cam member 45) of the cam mechanism is increased, press contact forces are generated between the friction plates 26, 29 on both the one and other sides of the multi-plate friction engagement mechanism via the tension member 43, whereby both the columns 1, 2 are fixed in place in the tilt direction by the multi-plate friction engagement mechanism.

At the same time, when the width of the pair of facing flat plate portions 14, 14 is narrowed via the tension member 43 to thereby press against the clamping portions 41, 41 (42, 42), the lower column 1 (the pair of halved bodies 40, 40) is diametrically contracted, whereby the upper column 2 is fastened by the lower column 1 (the pair of halved bodies 40, 40) so contracted and is then fixed in place in the telescoping direction.

Incidentally, in this embodiment, a tubular iron bush B is fitted in or on at least an inner circumferential surface of the lower column 1 (the outer column) and an outer circumferential surface of the upper column 2 (the inner column) at a fitting portion where both the columns 1, 2 are fitted on or in.

To be specific, as shown in FIGS. 4 and 5, the tubular iron bush B is fitted in the inner circumferential surface of the lower column 1 (the outer column). However, the bush B has no collar portion Ba which is bent back at an end portion of the lower column 1. Due to this, the iron bush B is preferably affixed to the inner circumferential surface of the lower column 1 (the outer column) with an adhesive.

The upper column 2 moves longitudinally through a telescoping operation (a telescoping adjustment). In this embodiment, sliding surfaces can be limited to an inner circumferential surface of the bush B and the outer circumferential surface of the upper column 2 by ensuring the fixing of the bush B with the inner circumferential surface of the lower column 1, which is made stationary, to the stationary side. Consequently, the iron bush B becomes superior in machining and assembling characteristics and the fixing of the iron bush B to the lower column 1 can be ensured, thereby making it possible to realize the implementation of a smooth and stable basic performance such as a sliding characteristic during telescoping and collapsing operations.

This is similarly true at the time of collision (secondary), and in the embodiment, by ensuring the fixing of the bush B to the lower column 1 side, the sliding surfaces can be limited, whereby the collapsing performance is stabilized.

THIRD EMBODIMENT

Figure 6:
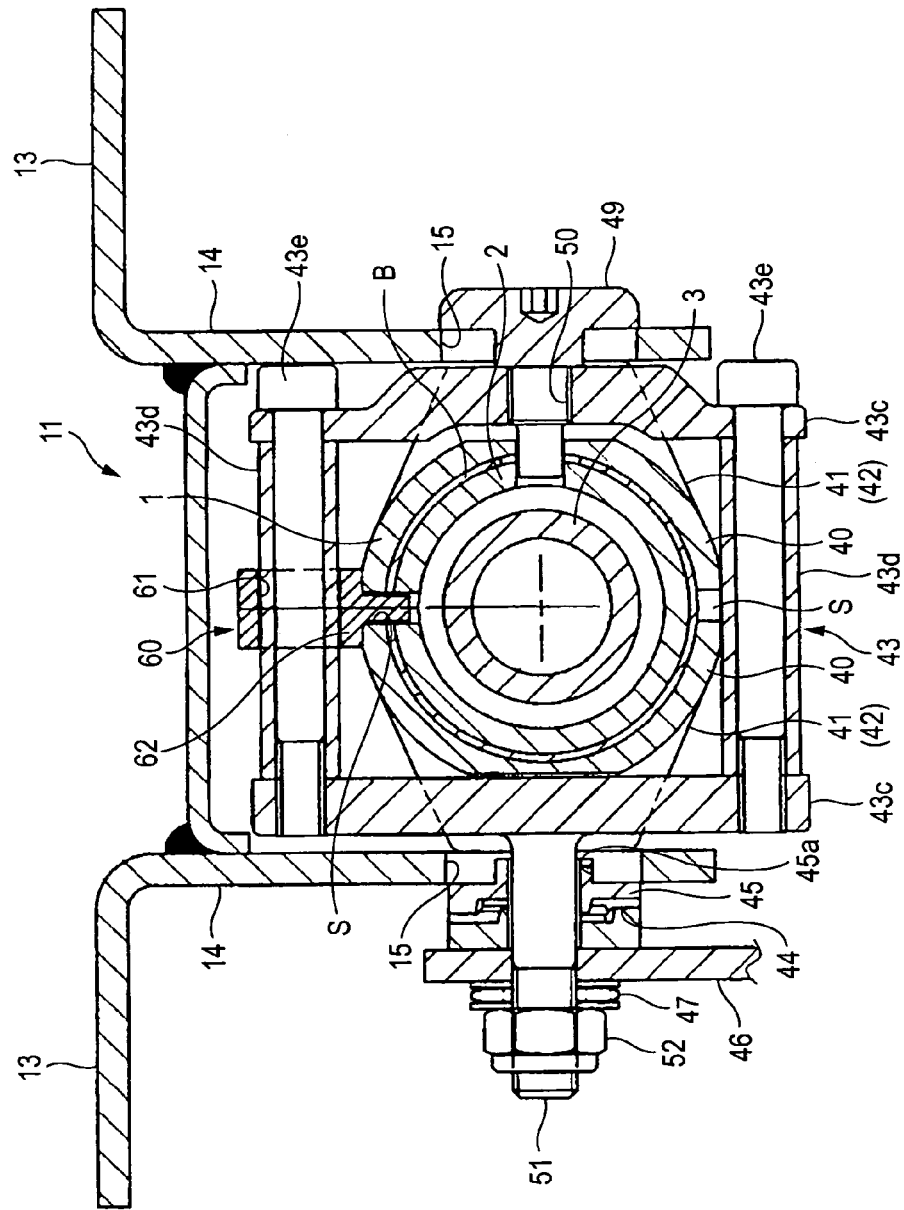
FIG. 6 is a cross-sectional view of a vehicle tilt and telescoping steering system according to a third embodiment of the invention.

FIG. 6 is a cross-sectional view of a vehicle tilt and telescoping steering system according to a third embodiment of the invention.

Figure 7:
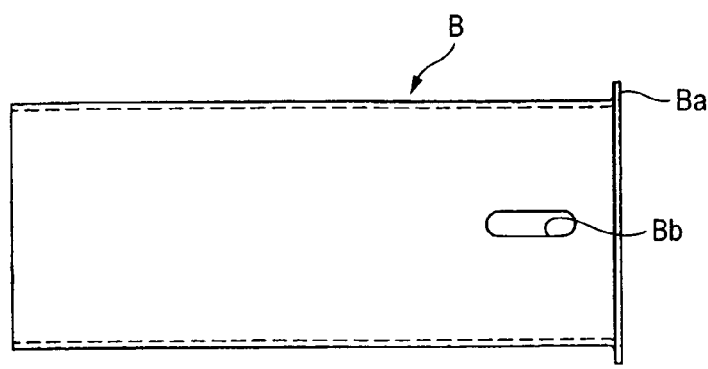
FIG. 7(a) is a plan view of a tubular metallic bush and FIG. 7(b) is a longitudinal sectional view showing a state in which the metallic bush is fitted between a lower column and an inner column.
Figure 7:
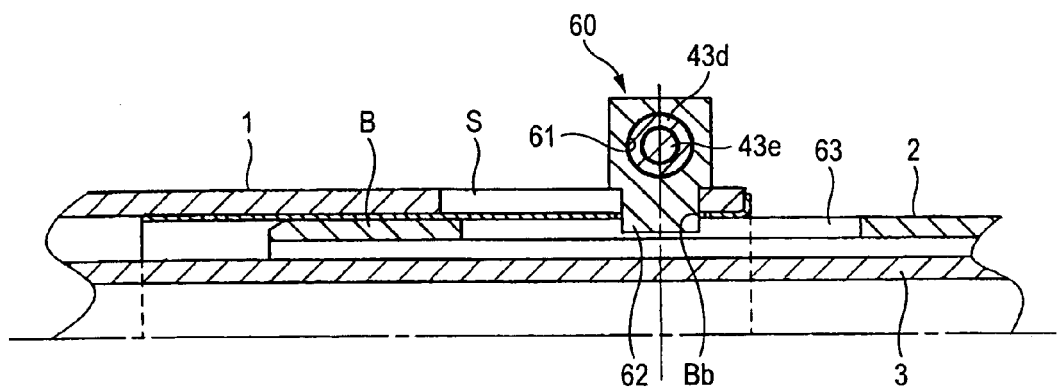

FIG. 7(*a*) is a plan view of a tubular metallic bush and FIG. 7(*b*) is a longitudinal sectional view showing a state in which the metallic bush is fitted between a lower column and an inner column.

A third embodiment is, as shown in FIG. 6, a tilt and telescoping type in which a clamping position thereof is designed to substantially intersect with an axis of a steering shaft. The construction of an upper vehicle body side bracket 11 is similar to that of the second embodiment except that no friction plates is provided.

A pair of left and right halved bodies 40, 40 are formed at a longitudinally rear location of the lower column 1, and the pair of left and right halved bodies 40, 40 are equally divided in a transverse direction relative to an axial direction and have two upper and lower slits S, S (slitting), respectively.

Two pairs of clamping portions 41, 41 (42, 42) are provided in front of and behind the halved bodies 40, 40, and slits S, S (slitting) are provided between the two pairs of clamping portions 41, 41 (42, 42).

According to this configuration, when the width of the pair of facing flat plate portions 14, 14 of the upper vehicle body side bracket 11 is narrowed, whereby the two pairs of clamping portions 41, 41 (42, 42) are pressed against in such a manner as to approach each other, the lower column 1 (the pair of halved bodies 40, 40) is diametrically contracted so as to fasten the upper column 2.

A substantially annular tension member 43 is provided along outer circumferences of the pair of left and right halved bodies 40, 40 and between the pair of clamping portions 41, 41 (42, 42) in a longitudinal direction of the vehicle.

In this embodiment, the tension member 43 is made up of a pair of facing members 43c, 43c and a pair of bolts 43e, 43e which are screwed there into via a pair of collars 43d, 43d so as to fasten the pair of facing members 43c, 43c. Note that a bolt 51, which extends transversely outwardly, is provided integrally on one of the facing members 43c in such a manner as to erect there from.

An adjustment nut 52 is screwed on the bolt 51, which is provided to so erect from the tension member 43, to be securely fastened thereto via a cam mechanism made up of a pair cam members 44, 45 and a manipulation lever 46.

In addition, a fastening bolt 49 is screwed into the tension member 43 from the other side thereof so as to be securely fastened in place therein.

Note that the cam mechanism is made up of the first cam member 44 which is adapted to rotate together with the manipulation lever 46 and which has crest portions and root portions and the second cam member 45 which is made non-rotatable and which has crest portions and root portions which are brought into engagement with the crest portions and the root portions of the first cam member 44. The operations of the first and second cam members 44, 45 are similar to those of the second embodiment.

However, a projection 45a on the second cam member 45 is brought into engagement with a tilt groove 15 in the facing flat plate portion 14, and does not rotate relative to the facing flat plate portion 14 but slides at the time of tilt adjustment.

In addition, a distal end portion of the fastening bolt 49 is brought into engagement with a telescoping elongate hole 50 formed in the upper column 2, and these telescoping elongate holes 50 are designed to function as stoppers for restricting a telescoping sliding range when they are brought into abutment with the distal end portion of the fastening bolt 49.

According to this configuration, when performing tilt and telescoping adjustments, firstly, the driver rotates the manipulation lever 46 in one direction. Then, the first cam member 44, which is in integral engagement with the manipulation lever 46, rotates relatively to the second cam member 45, and a width dimension of the cam mechanism (a distance between the first cam member 44 and the second cam member) is reduced.

When the width dimension of the cam mechanism is reduced from this series of actions, the pulling force acting on the pair of facing flat plate portions 14, 14 via the tension member 43 is eliminated, and as a result, both the columns 1, 2 are allowed to tilt. In addition, when the pulling force acting between the pair of facing flat plate portions 14, 14 via the tension member 43 is also eliminated, the pulling force acting between the pair of facing flat plate portions 14, 14 is also eliminated via the tension member 43, the pressing force against the clamping portions 41, 41 (42, 42) on internal sides of the pair of facing flat plate portions 14, 14 is eliminated.

This allows the lower column 1 (the pair of halved bodies 40, 40) to diametrically expand by virtue of its elastic force and the lower column 1 then loses its tightening force applied to the upper column 2, whereby the upper column 2 is allowed to telescope.

When completing the positional adjustment of the steering wheel through the tilt and telescoping adjustments, the driver rotates the manipulation lever in the other direction. Then, since the width dimension (the distance between the first cam member 44 and the second cam member 45) of the cam mechanism is increased, the width of the pair of facing flat plate portions 14, 14 is narrowed via the tension member 43, and the clamping portions 41, 41 (42, 42) are pressed against. This causes the lower column 1 (the pair of halved bodies 40, 40) to be diametrically contracted, whereby the upper column 2 is fastened by the lower column 1 (the pair of halved bodies 40, 40) so contracted and is then fixed in place in the telescoping direction.

Incidentally, in this embodiment, a tubular iron bush B is fitted in or on at least an inner circumferential surface of the lower column 1 (the outer column) and an outer circumferential surface of the upper column 2 (the inner column) at a fitting portion where both the columns 1, 2 are fitted on or in.

To be specific, the tubular iron bush B is fitted in the inner circumferential surface of the lower column 1 (the outer column) and the bush B has a collar portion Ba which is bent back at an end portion of the lower column 1. This collar portion Ba is brought into engagement with an end edge of the lower column 1 (the outer column) to thereby prevent the bush B from being swallowed into the lower column 1.

Furthermore, a stopper 60 is provided for the bush B. This stopper 60 has a through hole 61 through which the collar 43d of the tension member 43 is passed and an engagement projection 62 which is brought into engagement with an elongate hole Bb formed in the bush B.

One end of the stopper 60 enters the slit S in the lower column 1, the elongate hole Bb in the bush B and a groove 63 in the upper column 2. It is possible that no groove 63 is set in the upper column 2. However, the length of the end of the stopper is shortened so that the end of the stopper does not interfere with the upper column 2. In addition, it may be possible that the engagement of the fastening bolt 49 with the telescoping elongate hole 50 in the upper column 2 is eliminated, so that the engagement projection 62 is instead made to function as the stopper.

The upper column 2 moves longitudinally through a telescoping operation (a telescoping adjustment). In this embodiment, sliding surfaces can be limited to an inner circumferential surface of the bush B and the outer circumferential surface of the upper column 2 by ensuring the fixing of the bush B with the inner circumferential surface of the lower column 1, which is made stationary, to the stationary side. Consequently, the iron bush B becomes superior in machining and assembling characteristics and the fixing of the iron bush B to the lower column 1 can be ensured, thereby making it possible to realize the implementation of a smooth and stable basic performance such as a sliding characteristic during telescoping and collapsing operations.

This is similarly true at the time of collision (secondary), and in the embodiment, by ensuring the fixing of the bush B to the lower column 1 side, the sliding surfaces can be limited, whereby the collapsing performance is stabilized.

FOURTH EMBODIMENT

Figure 8:
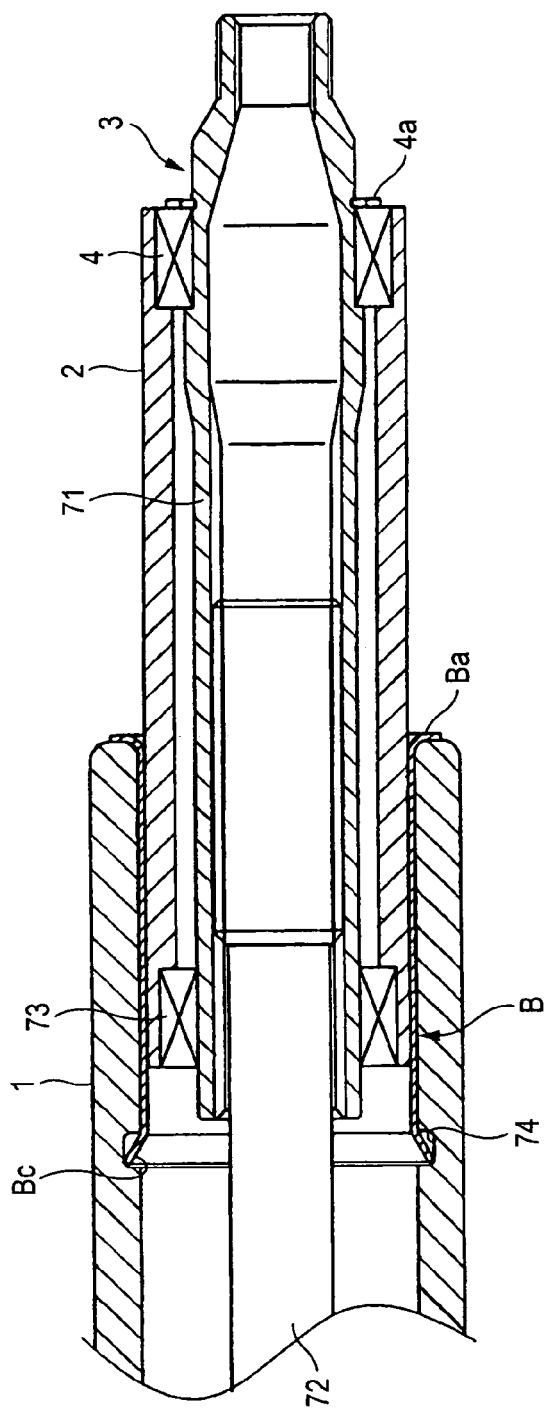
FIG. 8(a) is a longitudinal sectional view of a vehicle tilt and telescoping steering system according to a fourth embodiment of the invention.
FIG. 8(b) is a side view of an iron bush and FIG. 8(c) is a side view of an iron bush according to a modified example.
Figure 8:
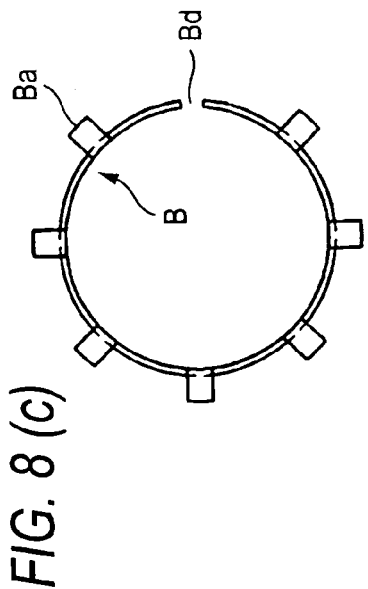
Figure 8:
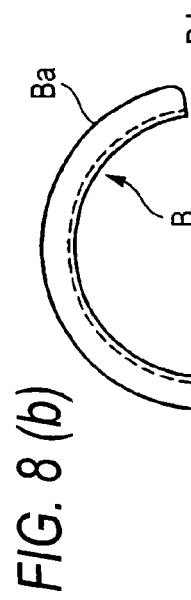

FIG. 8(*a*) is a longitudinal sectional view of a vehicle tilt and telescoping steering column system according to a fourth embodiment of the invention, FIG. 8(*b*) is a side view of an iron bush, and FIG. 8(*c*) is a side view of an iron bush according to a modified example. Only different features from the second and third embodiments will be described.

In this embodiment, a steering shaft 3 is made up of a tubular upper shaft 71 which is rotatably supported by a bearing 4 and a bearing 73 within an upper column 2 and a lower shaft 72, functioning as an intermediate shaft, which is provided slidably relative to the tubular upper shaft 71 through spline fitting. Consequently, when telescopic sliding occurs, the upper column 2 and the upper shaft 71 can move in the axial direction together with the bearings 4, 73.

Incidentally, in this embodiment, a tubular iron bush B is fitted in or on at least an inner circumferential surface of the lower column 1 (the outer column) and an outer circumferential surface of the upper column 2 (the inner column) at a fitting portion where both the columns 1, 2 are fitted on or in.

To be specific, the tubular iron bush B is fitted in the inner circumferential surface of the lower column 1 (the outer column) and the bush B has a collar portion Ba which is bent back through tightening at an end portion of the lower column 1. This collar portion Ba is brought into engagement with an end edge of the lower column 1 (the outer column) to thereby prevent the bush B from being swallowed into the lower column 1.

In addition, as shown in FIG. 8(*b*), the collar portion Ba may be formed along substantially the full circumference of the bush B, or instead of this, as shown in FIG. 8(*c*), a plurality of collar portions Ba may be provided partially along the circumference of the bush B. Furthermore, the collar Ba does not have to be tightened at 90 degrees (right angle). Furthermore, in this embodiment, as will be described later on, since a collar portion Bc is provided at a front end portion of the bush B, the bush Ba at the rear end may be eliminated.

Furthermore, in this embodiment, a circumferential groove 74 is formed in the inner circumferential surface of the lower column 1, and the bush B is bent by a predetermined angle at which the front end portion of the bush B is expanded towards the upper column 2 by tightening, whereby the collar Bc is formed. This collar Bc is inserted in the circumferential groove 74 so as to be in engagement therewith, whereby the bush B can be fixed to the lower column, which is made stationary, in an ensured fashion.

The collar Bc may be formed along substantially the full circumference of the bush B, or instead of this, a plurality of collars Bc may be provided partially along the circumference of the bush B. In the latter case in which the collars Bc are provided partially, when the upper column 2 is collapsed while being prized, there is caused no risk that the bush B is caught in the circumferential groove 74.

Furthermore, as shown in FIGS. 8(*b*), 8(*c*), a slit Bd (a notched portion) may be formed in the iron bush B and the collar Ba thereof in such a manner as to extend in the axial direction. In this case, the collars Ba, Bc are formed before the bush B is inserted, and then the bush B is diametrically contracted for assembly.

The upper column 2 moves longitudinally through a telescoping operation (a telescoping adjustment). In this embodiment, sliding surfaces can be limited to an inner circumferential surface of the bush B and the outer circumferential surface of the upper column 2 by ensuring the fixing of the bush B with the inner circumferential surface of the lower column 1, which is made stationary, to the stationary side. Consequently, the iron bush B becomes superior in machining and assembling characteristics and the fixing of the iron bush B to the lower column 1 can be ensured, thereby making it possible to realize the implementation of a smooth and stable basic performance such as a sliding characteristic during telescoping and collapsing operations.

This is similarly true at the time of collision (secondary), and in the embodiment, by ensuring the fixing of the bush B to the lower column 1 side, the sliding surfaces can be limited, whereby the collapsing performance is stabilized.

FIFTH EMBODIMENT

Figure 9:
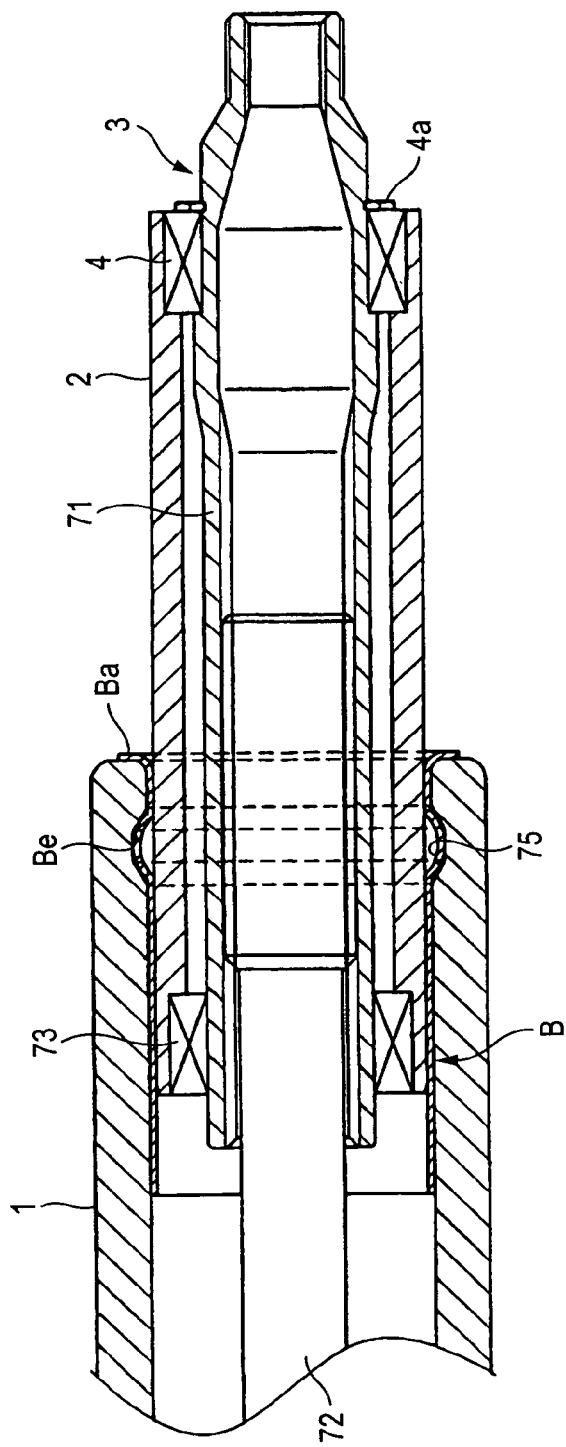
FIG. 9(a) is a longitudinal sectional view of a vehicle tilt and telescoping steering system according to a fifth embodiment of the invention.
FIG. 9(b) is a cross-sectional view of an iron bush.
Figure 9:
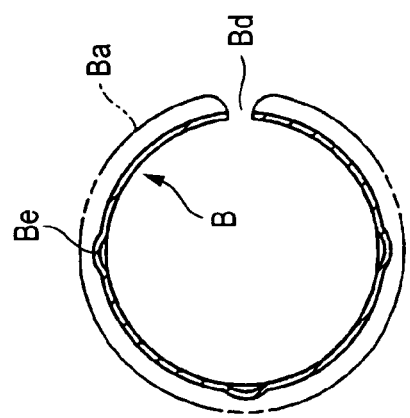

FIG. 9(*a*) is a longitudinal sectional view of a vehicle tilt and telescoping steering column system according to a fifth embodiment of the invention, and FIG. 9(*b*) is a cross-sectional view of an iron bush. Only different features from the fourth embodiment will be described below.

In this embodiment, a tubular iron bush B is fitted in or on at least an inner circumferential surface of the lower column 1 (the outer column) and an outer circumferential surface of the upper column 2 (the inner column) at a fitting portion where both the columns 1, 2 are fitted on or in.

To be specific, the tubular iron bush B is fitted in the inner circumferential surface of the lower column 1 (the outer column) and the bush B has a collar portion Ba which is bent back through tightening at an end portion of the lower column 1. This collar portion Ba is brought into engagement with an end edge of the lower column 1 (the outer column) to thereby prevent the bush B from being swallowed into the lower column 1.

In addition, as shown in FIG. 9(*b*), the collar portion Ba may be formed along substantially the full circumference of the bush B. Furthermore, in this embodiment, as will be described later on, since a projection Be is provided on the bush B the collar Ba at the rear end may be eliminated.

Furthermore, in this embodiment, a circumferential groove 75 is formed in the inner circumferential surface of the lower column 1, and a projection Be which is made to protrude radially outwardly is formed on the bush B. The projection Be is inserted in the circumferential groove 75 so as to be in engagement therewith, whereby the bush B can be fixed to the lower column 1, which is made stationary, in an ensured fashion.

This projection Be may also be formed along substantially the full circumference of the bush B, or instead of this, as shown in FIG. 9(*b*), a plurality of projections Be may be provided partially along the circumference of the bush B.

Furthermore, as shown in FIG. 9(*b*), a slit Bd (a notched portion) may be formed in the iron bush B and the collar Ba thereof in such a manner as to extend in the axial direction. In this case, the collar Ba and the projection Be are formed before the bush B is inserted, and then the bush B is diametrically contracted for assembly.

The upper column 2 moves longitudinally through a telescoping operation (a telescoping adjustment). In this embodiment, sliding surfaces can be limited to an inner circumferential surface of the bush B and the outer circumferential surface of the upper column 2 by ensuring the fixing of the bush B with the inner circumferential surface of the lower column 1, which is made stationary, to the stationary side. Consequently, the iron bush B becomes superior in machining and assembling characteristics and the fixing of the iron bush B to the lower column 1 can be ensured, thereby making it possible to realize the implementation of a smooth and stable basic performance such as a sliding characteristic during telescoping and collapsing operations.

This is similarly true at the time of collision (secondary), and in the embodiment, by ensuring the fixing of the bush B to the lower column 1 side, the sliding surfaces can be limited, whereby the collapsing performance is stabilized.

SIXTH EMBODIMENT

Figure 10:
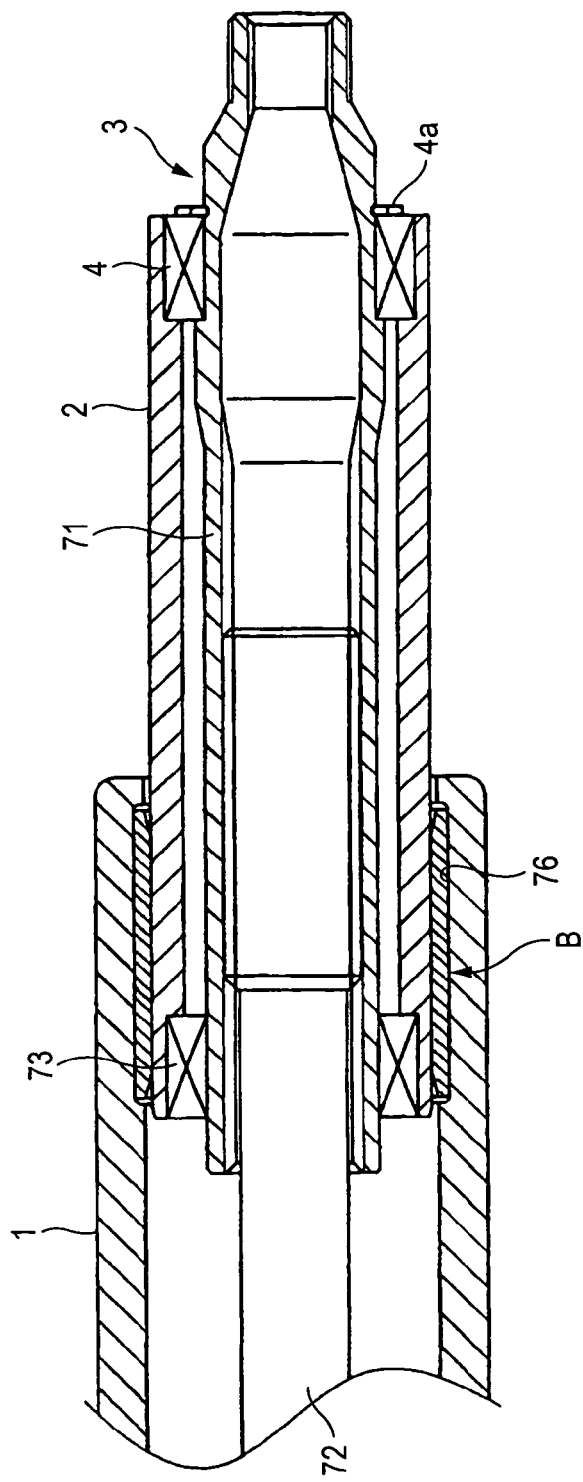
FIG. 10(a) is a longitudinal sectional view of a vehicle tilt and telescoping steering system according to a sixth embodiment of the invention.
FIG. 10(b) is a cross-sectional view of an iron bush.
Figure 10:
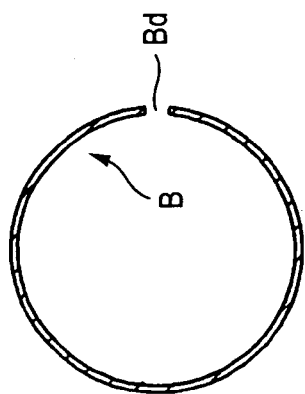

FIG. 10(a) is a longitudinal sectional view of a vehicle tilt and telescoping steering column system according to a sixth embodiment of the invention, and FIG. 10(b) is a cross-sectional view of an iron bush. Only different features from the fourth embodiment will be described below.

In this embodiment, a tubular iron bush B is fitted in or on at least an inner circumferential surface of the lower column 1 (the outer column) and an outer circumferential surface of the upper column 2 (the inner column) at a fitting portion where both the columns 1, 2 are fitted on or in.

To be specific, the tubular iron bush B is fitted in the inner circumferential surface of the lower column 1 (the outer column).

Namely, a wide circumferential groove 76 is formed in the inner circumferential surface of the lower column (the outer column), and the iron bush B is formed thick, whereby the bush B can be fixed to the lower column 1, which is made stationary, in an ensured fashion. Note that an internal side of the bush B is preferably formed in such a manner as to protrude, although only by a slight amount, more radially inwardly than the internal side of the lower column 1. Namely, the inside diameter of the bush B is made smaller than the inside diameter of the lower column 1 (the outer column).

Furthermore, as shown in FIG. 10(b), a slit Bd (a notched portion) may be formed in the iron bush B in such a manner as to extend in the axial direction. In this case, the bush B is diametrically contracted before the bush B is inserted for assembly. The upper column 2 moves longitudinally through a telescoping operation (a telescoping adjustment). In this embodiment, sliding surfaces can be limited to an inner circumferential surface of the bush B and the outer circumferential surface of the upper column 2 by ensuring the fixing of the bush B with the inner circumferential surface of the lower column 1, which is made stationary, to the stationary side. Consequently, the iron bush B becomes superior in machining and assembling characteristics and the fixing of the iron bush B to the lower column 1 can be ensured, thereby making it possible to realize the implementation of a smooth and stable basic performance such as a sliding characteristic during telescoping and collapsing operations.

This is similarly true at the time of collision (secondary), and in the embodiment, by ensuring the fixing of the bush B to the lower column 1 side, the sliding surfaces can be limited, whereby the collapsing performance is stabilized.

SEVENTH EMBODIMENT

FIG. 11(a) is a longitudinal sectional view of a vehicle tilt and telescoping steering column system according to a seventh embodiment of the invention, and FIG. 11(b) is a side view of an iron bush. Only different features from the fourth embodiment will be described below.

In this embodiment, a tubular iron bush B is fitted in or on at least an inner circumferential surface of the lower column 1 (the outer column) and an outer circumferential surface of the upper column 2 (the inner column) at a fitting portion where both the columns 1, 2 are fitted on or in.

To be specific, the tubular iron bush B is fitted in the inner circumferential surface of the lower column 1 (the outer column) and the bush B has a collar portion Ba which is bent back through tightening at an end portion of the lower column 1. This collar portion Ba is brought into engagement with an end edge of the lower column 1 (the outer column) to thereby prevent the bush B from being swallowed into the lower column 1. In addition, as shown in FIG. 11(b), the collar Ba may be formed along substantially the full circumference of the bush B.

Furthermore, in this embodiment, a circumferential groove 77 is formed in an outer circumferential surface of the lower column 1 at a rear end portion thereof. As shown in FIG. 11(b), a plurality of irregular locking portions Bf are formed on the collar Ba of the bush B in such a manner as to extend. These locking portions Bf are brought into engagement with the circumferential groove 77 in the lower column 1, whereby the bush B can be fixed to the lower column 1, which is made stationary, in an ensured fashion.

Furthermore, as shown in FIG. 11(b), a slit Bd (a notched portion) may be formed in the iron bush B and the collar Ba thereof in such a manner as to extend in the axial direction. In this case, the collar Ba and the locking portion Bf are formed before the bush B is inserted, and then the bush B is diametrically contracted for assembly.

The upper column 2 moves longitudinally through a telescoping operation (a telescoping adjustment). In this embodiment, sliding surfaces can be limited to an inner circumferential surface of the bush B and the outer circumferential surface of the upper column 2 by ensuring the fixing of the bush B with the inner circumferential surface of the lower column 1, which is made stationary, to the stationary side. Consequently, the iron bush B becomes superior in machining and assembling characteristics and the fixing of the iron bush B to the lower column 1 can be ensured, thereby making it possible to realize the implementation of a smooth and stable basic performance such as a sliding characteristic during telescoping and collapsing operations.

This is similarly true at the time of collision (secondary), and in the embodiment, by ensuring the fixing of the bush B to the lower column 1 side, the sliding surfaces can be limited, whereby the collapsing performance is stabilized.

EIGHTH EMBODIMENT

Figure 12:
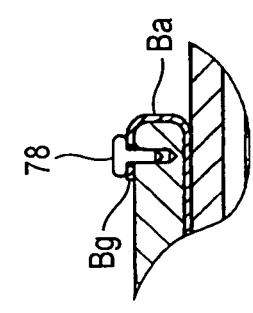
FIG. 12(a) is a longitudinal sectional view of a vehicle tilt and telescoping steering system according to an eighth embodiment of the invention.
FIG. 12(b) is a partial sectional view showing a modified example.
Figure 12A:
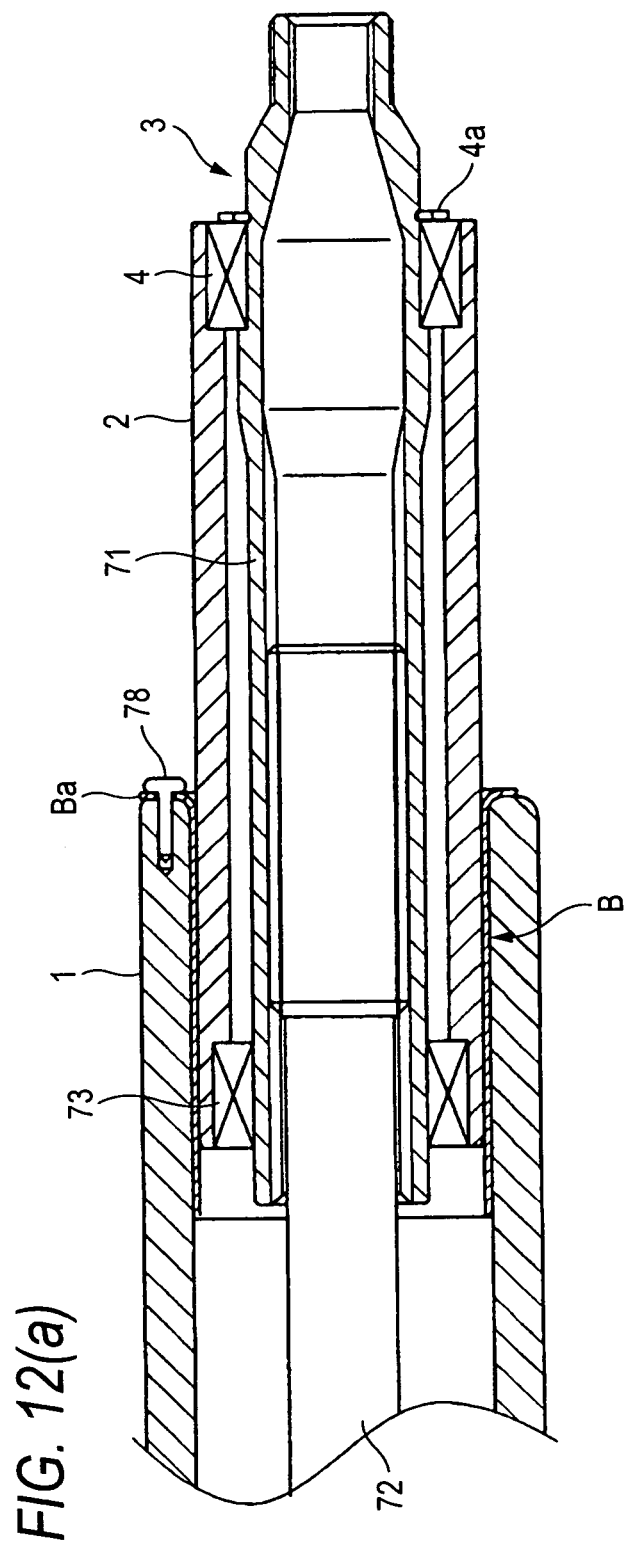

FIG. 12(a) is a longitudinal sectional view of a vehicle tilt and telescoping steering column system according to a seventh embodiment of the invention, and FIG. 12(b) is a partial sectional view of a modified example. Only different features from the fourth embodiment will be described below.

In this embodiment, a tubular iron bush B is fitted in or on at least an inner circumferential surface of the lower column 1 (the outer column) and an outer circumferential surface of the upper column 2 (the inner column) at a fitting portion where both the columns 1, 2 are fitted on or in.

To be specific, the tubular iron bush B is fitted in the inner circumferential surface of the lower column 1 (the outer column) and the bush B has a collar portion Ba which is bent back through tightening at an end portion of the lower column 1. This collar portion Ba is brought into engagement with an end edge of the lower column 1 (the outer column) to thereby prevent the bush B from being swallowed into the lower column 1. In addition, the collar Ba may be formed along substantially the full circumference of the bush B.

Furthermore, in this embodiment, a pin 78 is press fitted through and in the collar Ba and an end face of the lower column 1, whereby the bush B can be fixed to the lower column 1, which is made stationary, in an ensured fashion. In addition, the Bush Ba only has to be inserted from the end portion of the outer column 1 to be fixed in place.

Furthermore, as shown in FIG. 12(b), the pin 78 may be press fitted through an extended piece Bg which is extended from the collar Ba to an external side of the lower column 1.

Note that instead of the pin 78, the collar Ba or the extended portion Bg may be fixed using a member such as a machine screw or a clip.

The upper column 2 moves longitudinally through a telescoping operation (a telescoping adjustment). In this embodiment, sliding surfaces can be limited to an inner circumferential surface of the bush B and the outer circumferential surface of the upper column 2 by ensuring the fixing of the bush B with the inner circumferential surface of the lower column 1, which is made stationary, to the stationary side. Consequently, the iron bush B becomes superior in machining and assembling characteristics and the fixing of the iron bush B to the lower column 1 can be ensured, thereby making it possible to realize the implementation of a smooth and stable basic performance such as a sliding characteristic during telescoping and collapsing operations.

This is similarly true at the time of collision (secondary), and in the embodiment, by ensuring the fixing of the bush B to the lower column 1 side, the sliding surfaces can be limited, whereby the collapsing performance is stabilized.

Note that while, in the first to eighth embodiments that have been described heretofore, the bush B is described as being fixedly disposed on the lower column 1 (the upper column), the bush B may be integrally disposed on the upper column 2 (the inner column), or bushes B may be disposed on both the columns 1, 2.

NINTH EMBODIMENT

Figure 13:
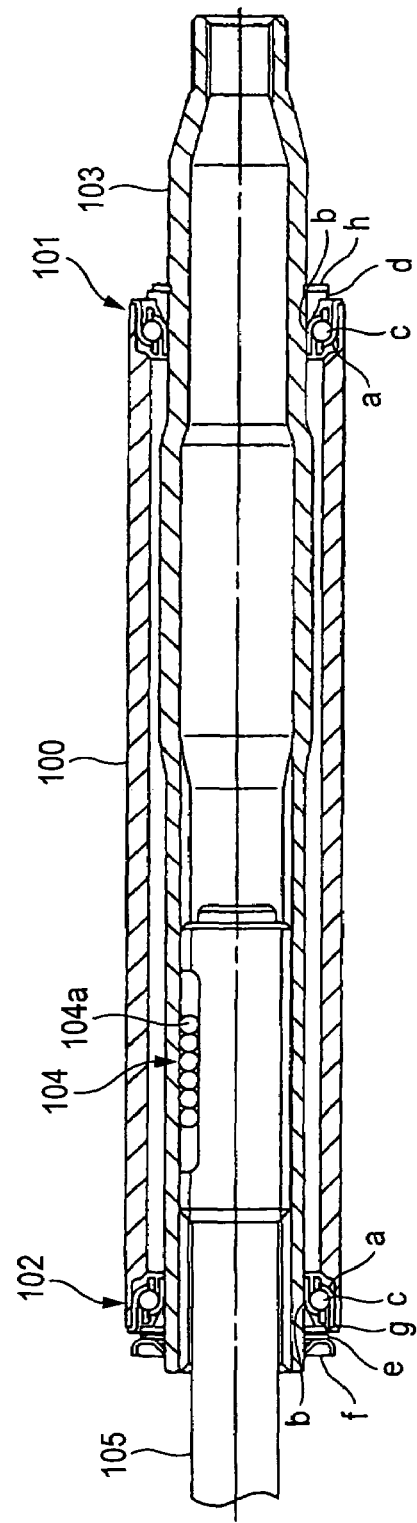
FIG. 13 is a longitudinal sectional view of a vehicle tilt and telescoping steering system according to a ninth embodiment of the invention.

FIG. 13 is a longitudinal sectional view of a vehicle steering column system according to a ninth embodiment of the invention.

A tubular upper shaft 103 is rotatably supported in a steering column 100 via a pair of bearings 101, 102, and a solid lower shaft 105 is connected slidably to the tubular upper shaft 103 via a slide joint 104. Note that the slide joint 104 is made up of rolling bodies 104a or the like.

While the bearings 101, 102 may be either rolling bearings or sliding bearings, the rolling bearings are preferable. Either a ball bearing or a roller bearing may be used as a rolling body for the rolling bearing. A deep groove ball bearing may be used as the ball bearing.

Furthermore, in place of them, the bearings 101, 102 may be made up of rolling bearings which are provided between the column 100 and the shaft 103 with an axial preload.

The rolling bearing of this type includes an outer ring a in which a track or groove is formed, an inner ring b in which a track or groove is formed, a row of rolling bodies c (balls) arranged between surfaces of the grooves in both the outer and inner rings a, b, and a wedge ring d, which is adapted to constitute a connection between the inner ring b and the shaft 103. Note that the wedge ring d is generally referred to as a press bearing.

The axial preload is generated by providing a spring member e relative to the rolling bodies c from an opposite side to the wedge ring d so as to be interposed between the rolling bodies c and a push nut f, which is provided to fix the spring member e.

Namely, the wedge ring d is provided on the bearing 101, whereas the axial preload is applied to the other bearing 102 by means of the spring member e and the like.

Note that for example, a waved washer, a coil spring, a coned disc spring and the like are used as the spring member e. In addition, a washer g may be provided between the wedge ring d and the spring member e, or between the spring member g and the push nut f. Alternatively, the relevant components may be disposed directly. Furthermore, the wedge ring d is fixed by means of a C-shaped snap ring h.

Next, FIG. 14(a) is a sectional view of a main portion according to a first modified example of the ninth embodiment, and FIG. 14(b) is a sectional view of a main portion according to a second modified example of the ninth embodiment.

As to the rolling bearings 101, 102 which are provided between the column 100 and the shaft 103 with the axial preload, in the event a push nut j is dislodged, the axial preload is reduced, and loosening is generated at the bearing portions. Due to this, the dislodgement of the push nut j may be attempted to be prevented as shown in FIGS. 14(a), 14(b).

In an example shown in FIG. 14(a), a spiral groove k is provided on an outer circumferential surface of the upper shaft 103 so that a pawl of the push nut j is allowed to easily bite there into, whereby the spiral groove k is designed to function as a preventive means for preventing the dislodgement of the push nut j.

In an example shown in FIG. 14(b), a tightened portion n is formed by tightening the outer circumferential surface of the upper shaft 103 from an end portion of the upper shaft 103 with a tightening tool m after the push nut j is press fitted thereon, whereby the tightened portion n is designed to function as a preventive means for preventing the dislodgement of the push nut j.

Thus, as has been described heretofore, according to the invention, since the iron bush is interposed on at least the inner circumferential surface of the outer column or the outer circumferential surface of the inner column, the iron bush becomes superior in machining and assembling characteristics, and the fixing of the iron bush to the outer column or the like can be implemented in an ensured fashion, whereby the basic performance such as the sliding characteristic during telescoping and collapsing can be attained smoothly and stably.

In addition, at the time of collision (secondary) by ensuring the fixing of the bush B to the lower column 1 side, the sliding surfaces can be limited, whereby the collapsing performance is stabilized.

Furthermore, in particular, in a steering system of a type in which a column type EPS with a telescoping function is used and a motor and a speed reduction mechanism unit of an EPS are provided at a location where a column exists, it is general that a collapsible stroke for collision cannot be ensured sufficiently (an extra limitation is imposed on the steering column system with a telescoping function).

Thus, since an energy absorption, which is smooth and strict in following an aimed load to stroke diagram, is necessary within the limited short collapsible stroke, the invention is effective in which the implementation of a smooth and stable basic performance such as a sliding characteristic during collapsing operation is realized within the short collapsible stroke.

While the invention has been described in detail and by reference to the specific embodiments, it is clear to those skilled in the art that the invention can be altered and modified in various ways without departing from the spirit and scope of the invention.

The subject patent application is based on a Japanese patent application (Patent Application No. 2003-309069) that was filed on Sep. 1, 2003 and the contents thereof are incorporated by reference.

INDUSTRIAL APPLICABILITY

As has been described heretofore, the invention can preferably be applied to a vehicle steering column system such as a telescoping steering column system in which the axial position of a steering wheel can be adjusted according to the body frame and driving posture of the driver.

The invention claimed is:

1. A vehicular position adjustable steering column system comprising:
    an outer column;
    an inner column which fits slidably in the outer column; and
    an iron bush which is interposed between an inner circumferential surface of the outer column and an outer circumferential surface of the inner column and which fits in or on at least one of the inner circumferential surface of the outer column and the outer circumferential surface of the inner column, wherein
    a relative position between the inner column and the outer column is adjusted by extending and contracting a diameter of the inner circumferential surface of the outer column.

2. The vehicle steering column system as set forth in claim 1, wherein
    the iron bush is bent back at one end portion of at least one of the outer column and the inner column.

3. The vehicle steering column system as set forth in claim 1, wherein
    a groove is provided in part of at least one of the inner circumferential surface of the outer column and the outer circumferential surface of the inner column, and
    a projection adapted to engage with the groove is provided on the iron bush.

4. The vehicle steering column system as set forth in claim 1, comprising further a position adjusting clamp mechanism, the position adjusting clamp mechanism having:
    a pair of clamping portions which are formed on the outer column, are faced each other across a slit, encloses and holds the inner column and are adapted to contract and expand so as to fasten and release the inner column;
    a pair of fastening bolts which are provided on both sides of the pair of clamping portions, respectively, and are disposed in a direction which intersects with an axis of a steering shaft;
    a fastening mechanism for moving one of the pair of fastening bolts in a fastening direction or a releasing direction in response to a swing of a manipulation lever; and
    a tension member which is provided radially outwardly of the outer column in such a manner as to form a substantially annular shape for connection of the pair of fastening bolts and is adapted to move the other fastening bolt in the fastening direction or the releasing direction when the one of the pair of fastening bolts is moved in the fastening direction or the releasing direction by the fastening mechanism.

5. The vehicle steering column system as set forth in claim 1, comprising further a position adjusting clamp mechanism, the position adjusting clamp mechanism having:
    a pair of thick clamping portions which are formed thick on the outer column, are faced each other across a slit, encloses and holds the inner column and are adapted to contract and expand so as to fasten and release the inner column;
    a fastening bolt provided in such a manner as to pass through the pair of thick clamping portions; and
    a fastening mechanism for moving the fastening bolt in a fastening direction or a releasing direction in response to a swing of a manipulation lever.

6. The vehicle steering column system as set forth in claim 1, wherein
    the iron bush includes a collar portion; and wherein
    the collar portion is brought into engagement with an end portion of at least one of the outer column and the inner column.

7. The vehicle steering column system as set forth in claim 1, comprising further a stopper portion for restricting a relative movement of the iron bush relative to the outer column or the inner column.

* * * * *